(12) United States Patent
Fausch et al.

(10) Patent No.: US 8,028,781 B2
(45) Date of Patent: Oct. 4, 2011

(54) FLEXIBLE UNDER-FRAME SHIELD

(75) Inventors: Joshua Juel Fausch, Ankeny, IA (US);
Brandon C. Carlson, Ankeny, IA (US);
Scott M. Buse, Indianolar, IA (US);
Garry E. Baxter, Ankeny, IA (US)

(73) Assignee: Deere & Company, Moline, IL (US)

( * ) Notice: Subject to any disclaimer, the term of this patent is extended or adjusted under 35 U.S.C. 154(b) by 269 days.

(21) Appl. No.: 12/427,331

(22) Filed: Apr. 21, 2009

(65) Prior Publication Data

US 2010/0264636 A1 Oct. 21, 2010

(51) Int. Cl.
*B62D 25/20* (2006.01)
(52) U.S. Cl. ........................... 180/69.1; 280/770
(58) Field of Classification Search .................. 280/770; 180/69.1, 157
See application file for complete search history.

(56) References Cited

U.S. PATENT DOCUMENTS

| | | | |
|---|---|---|---|
| 3,754,615 A * | 8/1973 | McIndoo et al. ............. | 180/69.1 |
| 4,498,277 A | 2/1985 | Bennett et al. | |
| 4,655,307 A * | 4/1987 | Lamoureux ................... | 180/69.1 |
| 5,074,573 A | 12/1991 | Dick | |
| 5,251,427 A | 10/1993 | Ulschmid et al. | |
| 5,405,292 A | 4/1995 | McConnell | |
| 5,794,976 A * | 8/1998 | Stevicks ........................ | 280/770 |
| 5,836,399 A | 11/1998 | Maiwald et al. | |
| 5,850,727 A | 12/1998 | Fox | |
| 6,202,778 B1 * | 3/2001 | Mistry et al. .................. | 180/69.1 |
| 6,435,298 B1 * | 8/2002 | Mizuno et al. ................ | 180/346 |
| 6,726,273 B2 * | 4/2004 | Kruschhausen et al. ...... | 296/204 |
| 6,802,517 B1 | 10/2004 | Wuthrich | |
| 7,025,168 B2 | 4/2006 | Wigdahl et al. | |
| 7,055,895 B1 | 6/2006 | King et al. | |
| 7,377,549 B2 * | 5/2008 | Hasegawa et al. ............ | 280/770 |
| 2005/0230177 A1 | 10/2005 | Wigdahl et al. | |

OTHER PUBLICATIONS

European Search Report received Jul. 28, 2010 (6 pages).

* cited by examiner

*Primary Examiner* — Toan To (57) ABSTRACT

An under-frame shield, particularly useful with crop sprayers and other implements which traverse fields of plants, includes one or more flexible sheet material shields connected to axle structure and to a central rigid shield by resilient connectors to facilitate suspension system movement in all directions without sacrificing ground clearance. The connection structure and sheet material shields maintain a smooth, seamless protective surface on the under side of the machine to reduce vehicle and crop damage.

19 Claims, 6 Drawing Sheets

FLEXIBLE UNDER-FRAME SHIELD

FIELD OF THE INVENTION

The present invention relates to crop shields for agricultural vehicles and, more specifically, to a flexible under-frame shield for such vehicles.

BACKGROUND OF THE INVENTION

Agricultural vehicles such as self-propelled sprayers have undersides that must be shielded to protect the vehicle from wear and damage by the plants and to protect the plants contacting the vehicle, particularly when the vehicle moves through tall crops. Currently available under-frame shielding typically utilizes stationary sheet metal which cannot flex to allow axle movements in floating axle or pivoting axle suspension systems. With movement of the axle, the distance between the axle and fixed locations on the under-frame will vary so that stationary arrangements are ineffective. Various shielding configurations have been proposed, such as shown in commonly assigned U.S. Pat. Nos. 5,405,292; 5,850,727; and 7,025,168. Such shields are not entirely satisfactory for providing a continuous barrier between the plants and the vehicle that does not harm the crop while adequately protecting the vehicle when operating in either the forward or reverse direction. In addition, many previously available shielding arrangements fail to provide adequate access to the lower portion of the vehicle during inspection and maintenance.

More recently, a new floating axle suspension system which eliminates expensive chrome spindles is described in commonly assigned and copending U.S. patent application Ser. No. 12/045,107, filed 10 Mar. 2008, entitled SUSPENDED AXLE FOR SPRAYER. Pairs of bars extend generally in the fore-and-aft direction from each axle and support the axle for vertical movement relative to the frame. A shield is required that provides protection adjacent the axle support bars and still accommodates the axle and bar movement.

SUMMARY OF THE INVENTION

An under-frame shields utilizes a combination of solid and flexible material with attachment and fastening structure facilitating axle movement and the resulting changes in position between attachment locations. A tarp or rubber material or other flexible material under the steering or tie rod mechanism accommodates twisting of the axle and, in a system with axle supporting rods, provides protection under substantially all the axle and axle supports. One end of the flexible shield portion attaches directly to the axle and moves with the axle. The opposite end of the flexible material is supported by brackets depending from the frame. A resilient strap system connects the opposite end to a generally rigid shield portion. An ultra-high molecular weight material (UHMW) bearing surface is interposed between the end of the flexible material and the rigid shield portion. In one embodiment, the rigid shield portion includes an upwardly opening sheet metal channel extending under the central belly portion of the vehicle. The strap system and contact surface allow the shield to move fore-and-aft with relatively little friction and wear while maintaining a consistent tension on the flexible shield material for maximum under-frame clearance and protection.

The under-frame shield allows the suspension system to move in all directions without sacrificing ground clearance. Therefore, the shield can afford superior protection, even when used with floating axle structures. The shield portions define a generally smooth seamless surface without gaps or sharp edges on the underside of the machine to reduce crop damage to allow machine operation in both forward and reverse directions, even in more mature crops. The straps can be disconnected and the rigid shield released to lower the shield from a working position to an access position. Continuous and generally seamless axle to axle shielding may be provided by utilizing a combination of flexible and non-flexible shields.

These and other objects, features and advantages of the present invention will become apparent from the description below in view of the drawings.

DESCRIPTION OF THE PREFERRED EMBODIMENT

Figure 1:
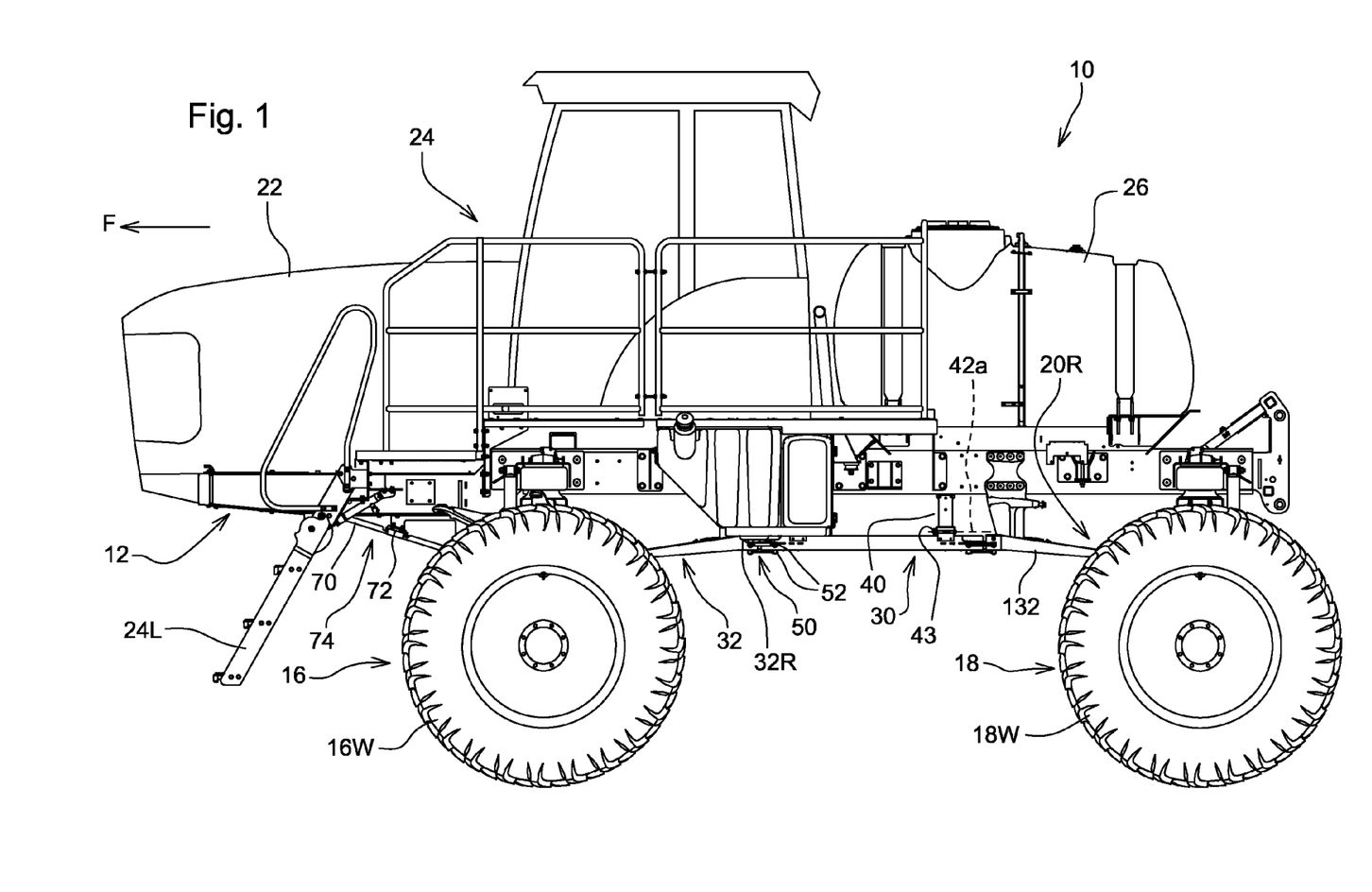
FIG. 1 is a side view of a vehicle having an under-frame shield.
Figure 5:
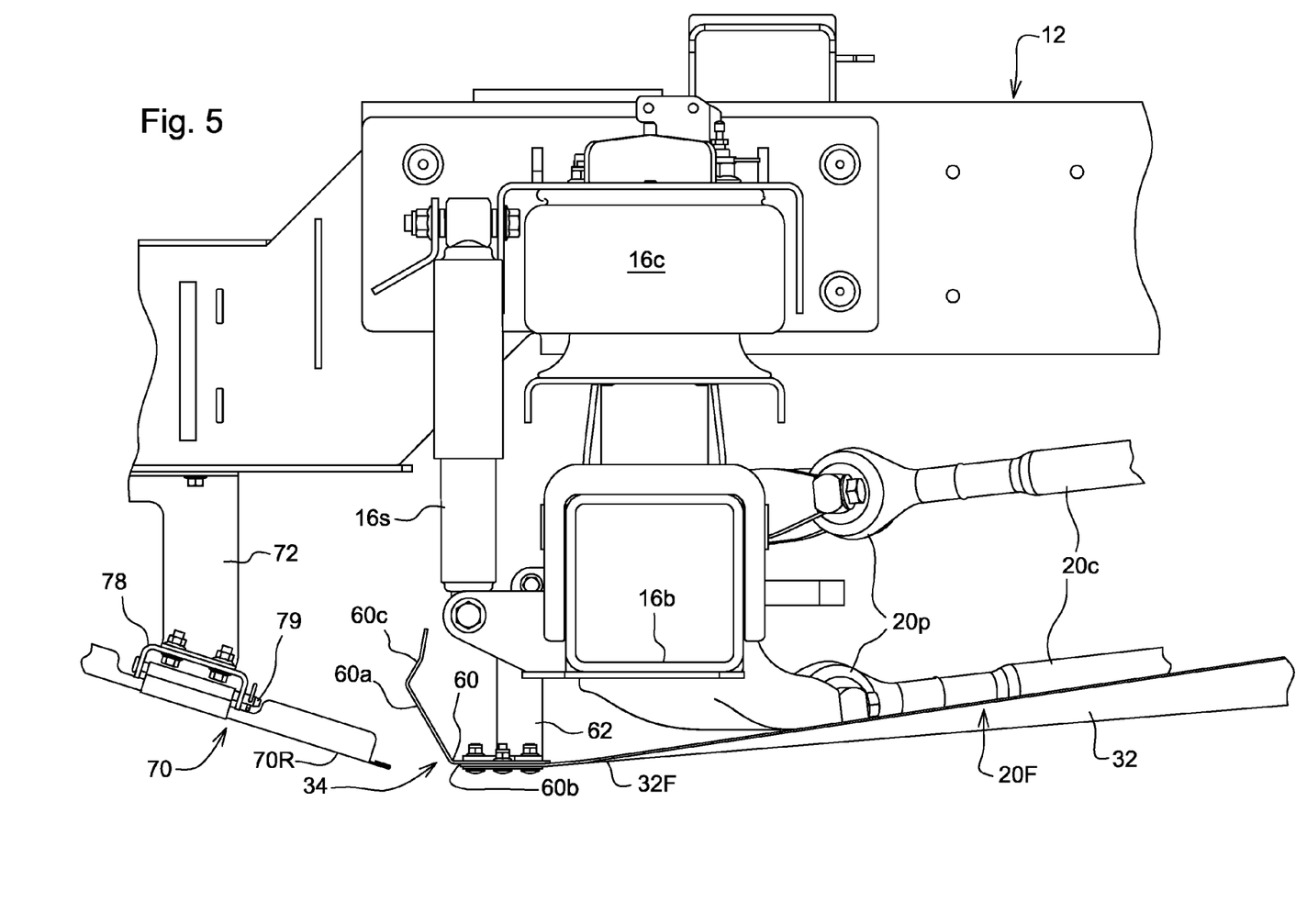
FIG. 5 is an enlarged side view of the front portion of the vehicle of FIG. 1 showing the front flexible portion of the shield protecting axle and axle support area.

Referring to FIG. 1 therein is shown an agricultural vehicle 10 adapted for movement over a field of tall plants. As shown, the vehicle 10 is self-propelled sprayer having a main frame 12 supported for forward movement over the ground by a forward wheel axle assembly 16 and an aft wheel axle assembly or structure 18 including transverse beams 16b and 18b supporting transversely spaced wheels 16w and 18w, respectively. At least the forward axle assembly 16 is steerable and is movably connected to the main frame 12 by suspension structure 20F (FIG. 5) which allows the beam 16b to rock vertically as the wheels 16w move over ground surface irregularities. A cushioning member or air bag 16c is interposed between the frame 12 and each side of the beam 16b, and shock absorbers 16s help dampen axle movement. As shown, the suspension structure 20F is of the type shown and described in the aforementioned U.S. application Ser. No. 12/045,107 and includes pairs of connecting rods 20c which, when viewed from the top, define an X, and when viewed from the side as shown in FIG. 5, are parallel to each other. The forward ends of the rods 20c are pivotally connected at locations 20p to the aft face of the beam 16b, and the aft ends of the rods 20c are pivotally connected to the main frame 12 generally above the rearmost extremity of the wheel 16w.

The rear axle assembly 18 may be fixed or moveably mounted. As shown, the rear axle assembly 18 is substantially similar to the front axle assembly 16 and is supported for rocking relative to the main frame 12 by suspension structure 20R similar to but generally the mirror image of the structure 20F. Although specific suspension and wheel assembly structure is described, it is to be understood that other types of suspension structures may also be utilized with the present invention.

The main frame 12 supports an engine compartment 22 forwardly and above the axle assembly 16, an operator access and cab area 24 above the axle assembly 16 and a tank or other treatment container 26 behind the cab area 24. The operator access and cab area 24 includes a retractable ladder 24L movable upwardly from an access position shown in FIG. 1 to a storage position (not shown) alongside the frame 12 to avoid plant contact during field-working operations.

As the vehicle 10 travels over a field of crops to be treated, the plants tend to deflect under the frame 12, and shielding is required to prevent both vehicle damage and plant damage. An under-frame plant shield assembly 30 includes a fore-and-aft extending flexible sheet shield material 32 having a transversely extending forward portion 32F with opposite sides 32a and 32b connected by a bracket and shield assembly 34 to the forward axle assembly 16.

As shown in FIGS. 1 and 5, the shield material 32 extends under the axle structure or beam 16b and under the fore-and-aft extending suspension structure 20F. The material 32 flexes with movement front axle assembly 16 and suspension structure 20F relative to the frame 12.

Figure 2:
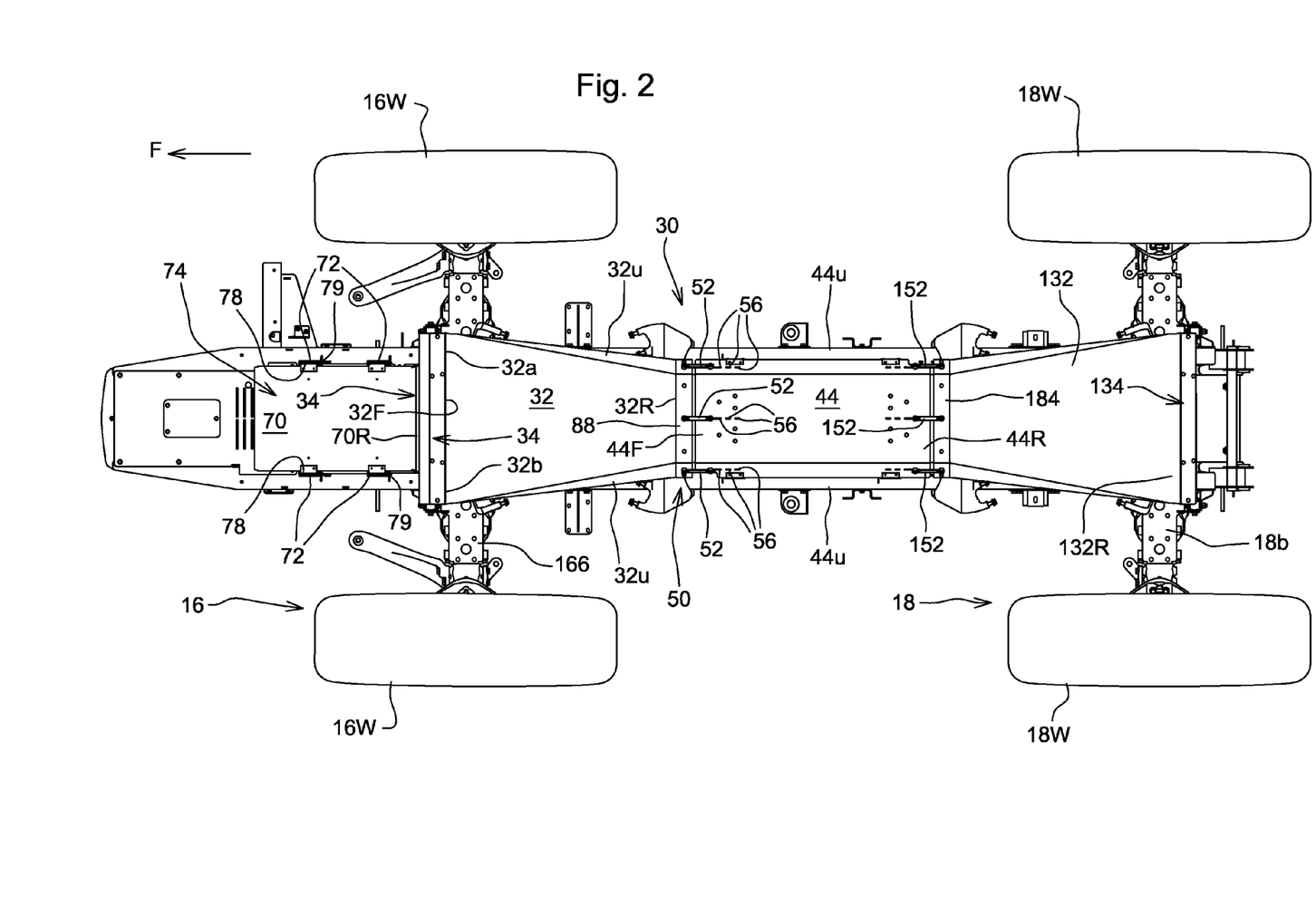
FIG. 2 is a bottom view of the vehicle of FIG. 1.
Figure 3:
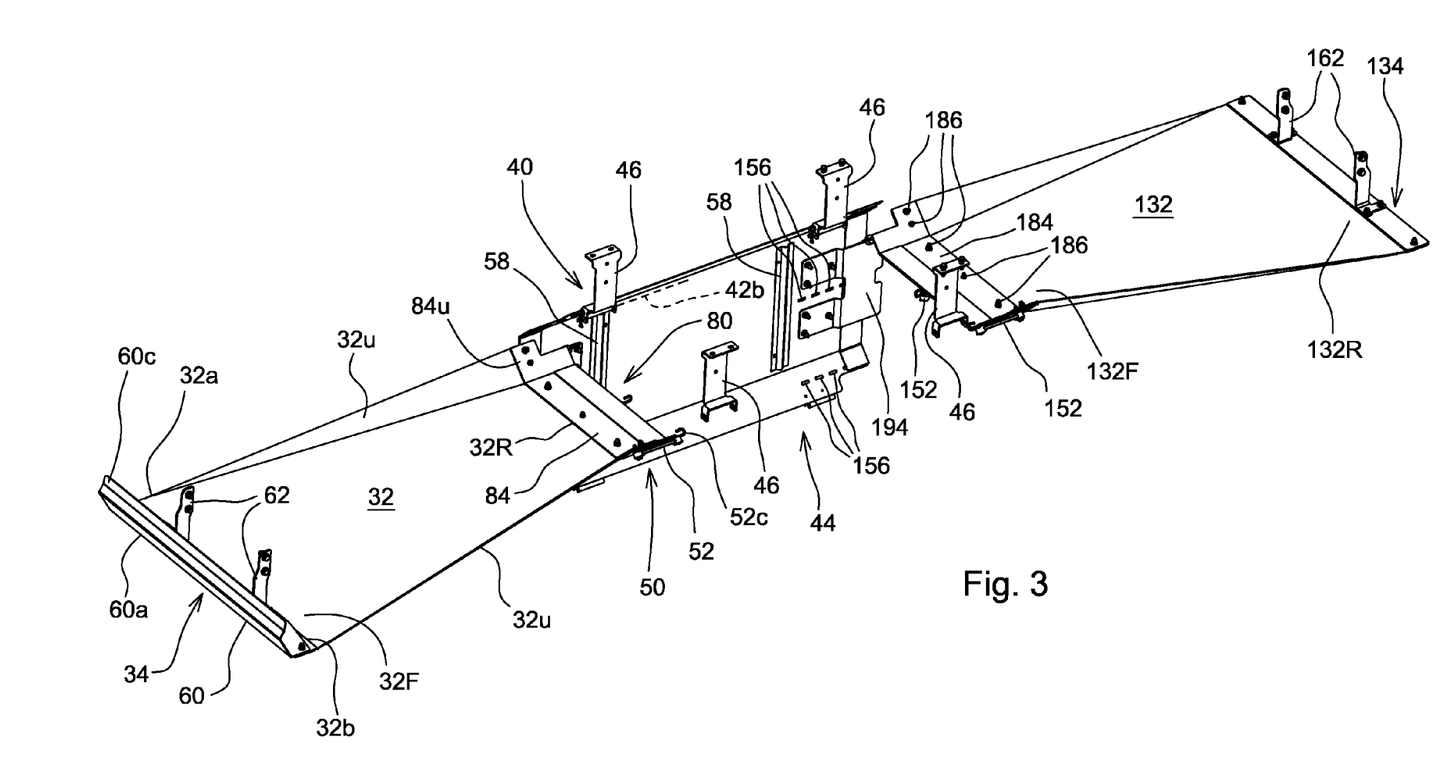
FIG. 3 is a perspective view of the shield with the access area in the open or service position.
Figure 4:
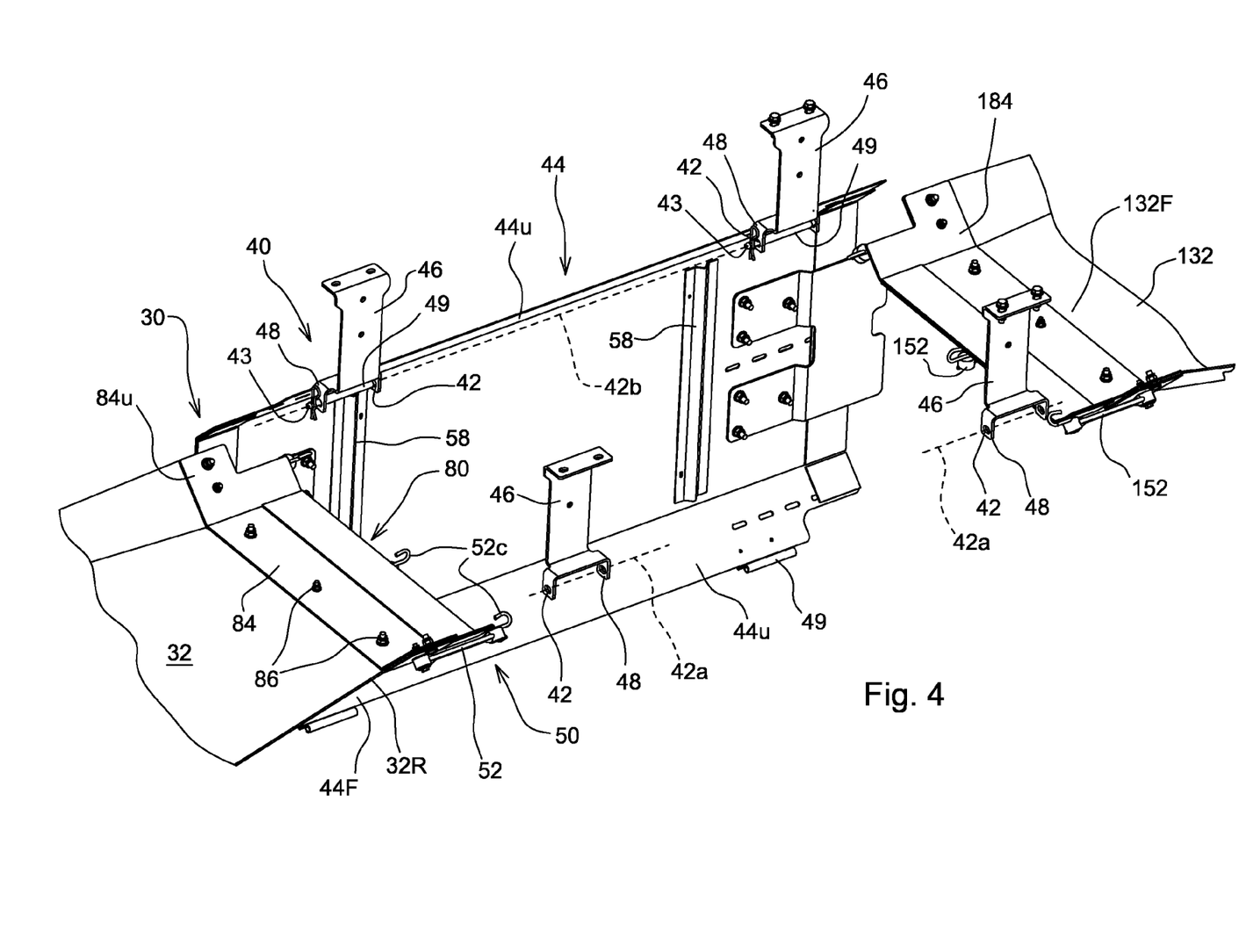
FIG. 4 is an enlarged view of the shield of FIG. 3.

Shield support structure 40 includes pairs of pivots 42 depending from the frame 12 and connected by releasable pivot pins 43 to a fore-and-aft extending and generally channel-shaped rigid central shield 44 with upturned sides 44u. The structure 40 supports the shield 44 under the central portion of the frame 12 for pivotal movement between a raised working position (FIGS. 1 and 2) and a lowered access position (FIGS. 3 and 4). By removing a set of the pins 43 from a pair of pivots 42 on either side of the frame, the shield may be pivoted downwardly about a corresponding pivotal axis 42a or 42b for access to the underside of the vehicle 10. The shield 44 may be completely removed from the vehicle 10 by removing all of the pivot pins 43 from both sides of the support structure 40.

The support structure 40 as shown is rigid and includes brackets 46 depending from the frame 12 and having bifurcated ends 48 receiving bushings 49 attached to the sides of the shield 44 and supported therein by the pins 43. The rigid shield 44 includes a forward end 44F connected to the aft end 32R of the shield material 32 at a first joint location 50. Resilient or stretchable connector structure 52 extends between slot locations 56 in the central shield 44 and the flexible shield 32 at the first joint location 50. The structure 52 allows the aft end 32R to move fore-and-aft and flex side-to-side as necessary during axle and suspension movement and helps to maintain the shield material 32 taut to provide a smooth plant repellent surface and maximize under-frame clearance. The connector structure 52 may be released by removing the connector ends from the slot locations 56 in the shield 44 so the shield 44 may be pivoted downwardly about either axis 42a or 42b or removed. Stiffeners or reinforcing members 58 connected to the inside of the floor of the shield 44 extend transversely between opposite pivot locations.

The bracket and shield assembly 34 includes a transversely extending axle shield 60 connected to the forward face of the axle beam 16 by spaced upright brackets 62. The brackets 62 support the axle shield 60 forwardly and partially below the beam 16b for movement with the front axle assembly 16. The axle shield 60 is formed from a rigid sheet material, such as sheet metal, and includes a forwardly facing panel 60a that extends upwardly and forwardly from a rear horizontal lip 60b bolted at transversely spaced locations to the forward end 32F of the shield 32. As best seen in FIG. 5, the shield 32 extends under the beam 16b and under the lowermost rods 20c. A top panel bent panel 60c extends upwardly and rearwardly from the panel 60a.

A fixed shield 70 connected below the frame 12 by shield brackets 72 extends downwardly in the rearward direction from a location under a central portion of the engine compartment 22 and terminates in an aft end 70R closely adjacent the axle shield 60. The shield 70 provides a sloped transition area 74 under the engine compartment leading into the forward portion of the plant shield assembly 30. Pivotal connections 78 with removable pivot pins 79 permit the forward shield 70 to be pivoted downwardly or removed in a manner similar to that for the pivoting shield 44.

Figure 6:
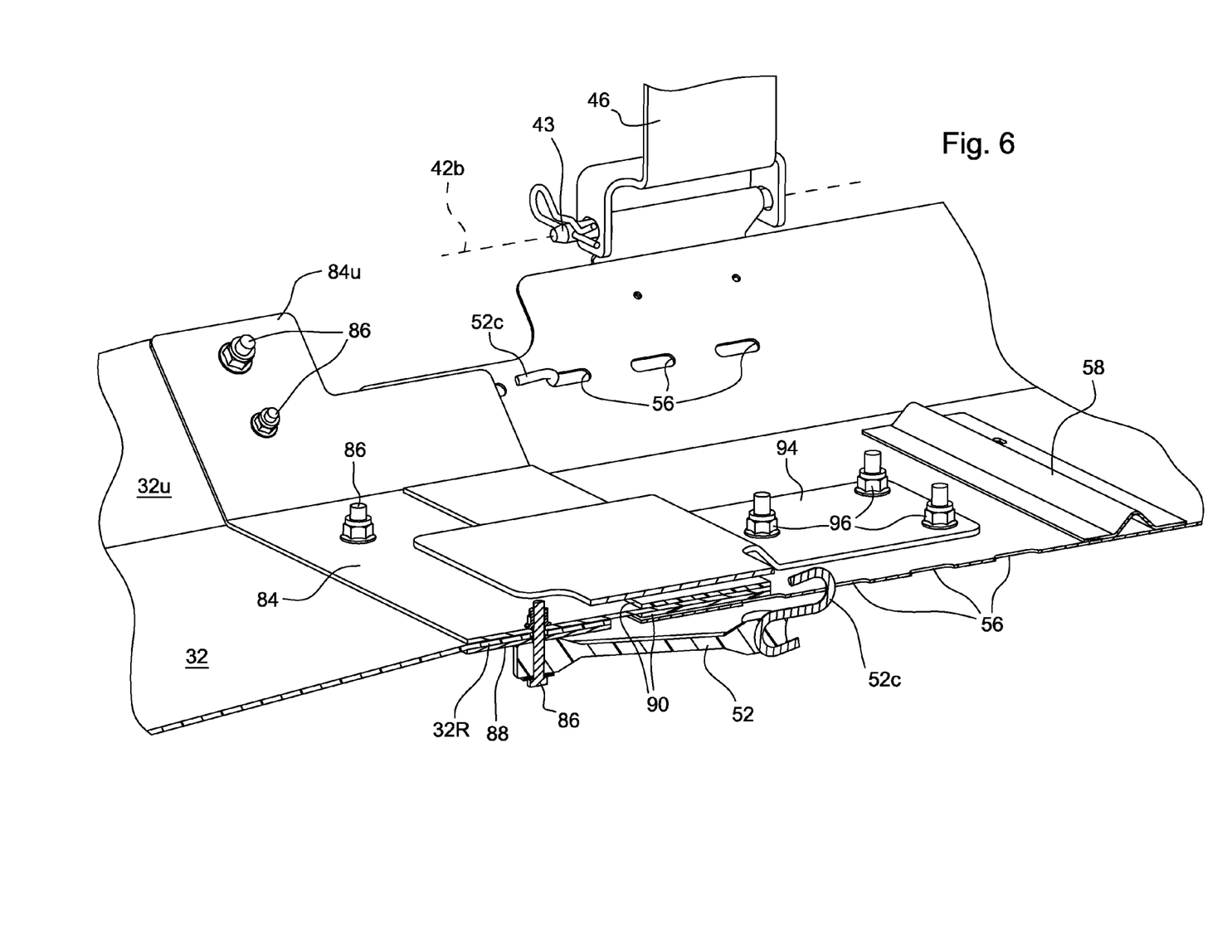
FIG. 6 is enlarged view, partially in section, showing the anti-friction pad support and connector structure between shield portions.

A contact surface 80 located between the flexible shield 32 and the rigid shield 44 at the first joint location 50 is in contact with the shields to reduce friction and wear on the portions of the shields that move adjacent one another. A formed sheet metal end connector 84 is connected by bolts 86 (FIGS. 4 and 5) to the aft end 32R of the sheet material 32. The bolts 86 extend through apertures in the sheet material 32, the connector 84 and a lower plate 88 (FIG. 6). The end 32R is sandwiched between the connector 84 and the lower plate 88. Upturned sides 84u support upturned sides 32u formed in the sheet material 32 to define a generally channel-shaped and gapless shielding area which opens upwardly from the front axle beam 16b to the aft end 44R of the shield 44. The bolts 86 also support the forward ends of the connector structure 52.

Anti-friction pads 90 formed from an ultra high molecular weight (UHMW) plastic material or other low friction wear material are mounted at the forward end of the central shield 44, and the aft end of the connector 84 is slidably supported between the pads 90. The pads 90 are sandwiched between the bottom panel of the shield 44 and a sheet metal pad support 94 connected by bolts 96 to the inside surface of the panel (FIG. 6). As the axle moves relative to the frame 12, the material 32 can flex and the connector structure 52 stretches as necessary to allow movement of the forward end of the connector 84 relative to the anti-friction pads 90. The structure 52 maintains the material 32 taut. S-shaped connectors 52c may be selectively placed in different slot locations 56c to adjust the tension on the material 32 and accommodate different sheet material 32 and vehicle chassis configurations. As shown, the sheet material 32 is a PVG compound with embedded fabric, such as Goodyear material PVG-110S1-DDb-72. Alternatively, a tarp or rubber material having similar consistency and flexibility as the PVG material as well as other flexible materials could be used.

The aft wheel axle assembly or structure 18 is connected to the aft end of a second flexible shield 132 similar in construction to that of the forward shield 32 to define a generally continuous barrier between the plant growth and the frame 12 from the forward wheel axle assembly 16 to the aft axle assembly 18. The flexible shield 132 includes a forward end 132F attached by bolts 186 a connector 184 in a manner similar to that described above for the connector 84. Resilient or stretchable connector structure 152 releasably connects the forward end 132F to selected apertures 156 in the rigid or central shield 44. A rear pad support 194 is bolted to the aft end of the shield 44 and supports anti-friction pads (not shown) in a manner similar to that described for the pads 90 described above.

The shield 132 is similar to the shield 32 and includes an aft end 132R connected to an axle shield assembly 134. Brackets 162 are bolted to the aft wheel axle assembly 18 so the assembly 134 supports the aft end 132R of the rear flexible shield 132 under the axle beam 18b and moves with the axle assembly 18 as it rocks relative to the frame 12. The shield 132 can flex as necessary to allow unrestricted rocking of the axle relative to the frame over the entire range of axle movement. The connectors 152 maintain the shield 132 taut under the frame 12 and under the rear axle support structure.

As best seen in FIGS. 3 and 4, the under-frame plant shield assembly 30 has a wasp-waist configuration that opens upwardly towards the underside of the vehicle 10 and provides generally continuous and seamless protection from the forward wheel axle assembly 16 to the aft wheel axle assembly 18. The forward fixed shield 70 extends the protection from the shield assembly 34 forwardly to a location under the engine compartment 22. Access to any location under the frame 12 is easily provided by the versatile pivotal mounting of the central shield 44 to the frame 12 and the releasable connector structure 52 and 152.

Having described the preferred embodiment, it will become apparent that various modifications can be made without departing from the scope of the invention as defined in the accompanying claims.

The invention claimed is:

1. An under-frame plant shield assembly for a vehicle with a frame supported by axle structure movable relative to the frame, the vehicle moveable forwardly over the ground where plant growth is present, the plant shield assembly comprising;
 an elongated flexible shield having a first end supported from the axle structure and flexing with movement of the axle structure, and a second end;
 a shield support connected to the frame and offset in the fore-and-aft direction from the axle;
 wherein the second end of the flexible shield is connected to the shield support below the frame, the flexible shield facilitating movement of the axle structure relative to the frame; and
 a rigid shield elongated in the fore-and-aft direction and having a first end connected to the second end of the flexible shield.

2. The plant shield assembly as set forth in claim 1 wherein flexible shield comprises a PVG compound with embedded fabric.

3. The plant shield assembly as set forth in claim 1 wherein the flexible shield comprises a rubber material.

4. The plant shield assembly as set forth in claim 1 including a self-tensioning connection located between the first end of the rigid shield and the flexible shield for maintaining the flexible shield taut as the axle structure moves relative to the frame.

5. The plant shield assembly as set forth in claim 1 including a support depending from the frame and connected to a rigid shield portion adjacent a first joint location, the support pivotally connecting the rigid shield portion to the frame for movement of the rigid support portion from an upper shielding position to a lowered access position for access to lower portions of the vehicle.

6. An under-frame plant shield assembly for a vehicle with a frame supported by axle structure movable relative to the frame, the vehicle moveable forwardly over the ground where plant growth is present, the plant shield assembly comprising;
 an elongated flexible shield having a first end supported from the axle structure and flexing with movement of the axle structure, and a second end;
 a shield support connected to the frame and offset in the fore-and-aft direction from the axle;
 wherein the second end of the flexible shield is connected to the shield support below the frame, the flexible shield facilitating movement of the axle structure relative to the frame; and
 wherein the axle structure comprises a forward axle and a rearward axle, the flexible shield is connected to the forward axle and to a forward end of the rigid shield, and a second flexible shield connected to the rearward axle and to an aft end of the rigid shield, and wherein the flexible shield, the rigid shield and the second flexible shield define a generally continuous wasp-waist shaped barrier between the plant growth and the frame from the forward axle to the rearward axle.

7. The plant shield assembly as set forth in claim 4 including a bearing surface interposed between the flexible shield and the rigid shield at a first joint location for accommodating motion and reducing friction between the rigid shield and the flexible shield.

8. An under-frame plant shield assembly for a vehicle with a frame supported by axle structure movable relative to the frame, the vehicle moveable forwardly over the ground where plant growth is present, the plant shield assembly comprising;
 an elongated flexible shield having a first end supported from the axle structure and flexing with movement of the axle structure, and a second end;
 a shield support connected to the frame and offset in the fore-and-aft direction from the axle;
 wherein the second end of the flexible shield is connected to the shield support below the frame, the flexible shield facilitating movement of the axle structure relative to the frame; and
 including an axle connector connected to the axle structure and to the first end of the flexible shield, wherein the flexible shield extends under the axle structure to prevent contact between the plant growth and the axle structure.

9. An under-frame plant shield assembly for a vehicle with a frame supported by axle structure movable relative to the frame, the vehicle moveable forwardly over the ground where plant growth is present, the plant shield assembly comprising;
 an elongated flexible shield having a first end supported from the axle structure and flexing with movement of the axle structure, and a second end;
 a shield support connected to the frame and offset in the fore-and-aft direction from the axle;
 wherein the second end of the flexible shield is connected to the shield support below the frame, the flexible shield facilitating movement of the axle structure relative to the frame; and
 wherein the rigid shield extends fore-and-aft under a central portion of the frame, the axle structure comprises a forward axle and a rearward axle, the flexible shield is connected to the forward axle and to a forward end of the rigid shield, and a second flexible shield connected to the rearward axle and to an aft end of the rigid shield, and wherein the flexible shield, the rigid shield and the second flexible shield define a generally continuous barrier between the plant growth and the frame from the forward axle to the rearward axle.

10. An under-frame plant shield for a vehicle with a frame supported by an transversely extending rockable axle structure, the vehicle frame moveable forwardly over the ground where plant growth is present, the plant shield assembly comprising;
 a fore-and-aft extending flexible sheet material having a transversely extending forward portion with opposite sides connected to the axle structure, the sheet material extending under the axle structure and flexing with rocking of the axle structure, the sheet material including an aft portion extending behind the axle structure; and
 a fore-and-aft extending generally rigid shield supported under the frame and including a forward end connected to the aft end of the flexible sheet material at a first joint location.

11. The plant shield assembly as set forth in claim 10 wherein the fore-and-aft extending shield comprises a pivoting member movable between a raised operating position and a lowered access position.

12. The plant shield assembly as set forth in claim 10 including a rigid axle shield connected to the forward end of the shield and extending upwardly and forwardly therefrom to protect the frame forwardly of the axle structure.

13. The plant shield assembly as set forth in claim 10 wherein the flexible sheet material is fabricated from a PVG compound with embedded fabric.

14. The plant shield assembly as set forth in claim 10 wherein the first joint location comprises a self-tensioning connection between the aft portion and the rigid shield.

15. The plant shield assembly as set forth in claim 14 wherein the self-tensioning connection comprises an elastic strap stretched between the flexible sheet and the rigid shield.

16. The plant shield assembly as set forth in claim 10 including a low friction contact surface located between the flexible shield and the rigid shield at the first joint location.

17. The plant shield assembly as set forth in claim 10 including a shield support pivotally supporting at least a portion of the fore-and-aft extending shield from the frame and facilitating movement of the fore-and-aft extending shield between an upper shielding position and a lowered access position.

18. The plant shield assembly as set forth in claim 10 including an axle connector depending from the rockable axle structure and connected to an end of the flexible sheet material.

19. The plant shield assembly as set forth in claim 10 wherein the rigid shield extends fore-and-aft under a central portion of the frame, the axle structure comprises a forward axle and a rearward axle, the flexible sheet material is connected to the forward axle and to a forward end of the rigid shield, and a second flexible sheet connected to the rearward axle and to an aft end of the rigid shield, and wherein the flexible sheet material, the rigid shield and the second flexible sheet define a generally continuous barrier between the plants and the frame from the forward axle to the rearward axle for facilitating movement of the axle structure relative to the frame.

* * * * *